United States Patent
Tsai et al.

(10) Patent No.: US 10,257,903 B1
(45) Date of Patent: Apr. 9, 2019

(54) SIGNAL DETECTING DEVICE AND LIGHT-EMITTING APPARATUS USING THE SAME

(71) Applicant: Wistron Corporation, New Taipei (TW)

(72) Inventors: Meng-Ru Tsai, New Taipei (TW); Chih-Hsiang Chien, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/920,473

(22) Filed: Mar. 14, 2018

(30) Foreign Application Priority Data

Dec. 27, 2017 (TW) .............................. 106146022 A

(51) Int. Cl.
*H05B 41/36* (2006.01)
*H05B 33/08* (2006.01)
*H02K 35/06* (2006.01)

(52) U.S. Cl.
CPC ......... *H05B 33/0866* (2013.01); *H02K 35/06* (2013.01)

(58) Field of Classification Search
CPC ............................. H05B 33/0866; H02K 35/06
USPC ........................................................ 315/291
See application file for complete search history.

(56) References Cited

U.S. PATENT DOCUMENTS

| | | | |
|---|---|---|---|
| 5,952,832 A * | 9/1999 | Stevanovic ......... | H05B 41/295 315/107 |
| 7,486,082 B2 | 2/2009 | Hachisuka et al. | |
| 7,492,162 B2 | 2/2009 | Hachisuka et al. | |
| 7,598,748 B2 | 10/2009 | Hachisuka et al. | |
| 2004/0012381 A1 | 1/2004 | Hachisuka et al. | |
| 2007/0103094 A1* | 5/2007 | Hachisuka ............. | G01R 15/18 315/291 |
| 2007/0103163 A1 | 5/2007 | Hachisuka et al. | |
| 2013/0069451 A1* | 3/2013 | Ruff ..................... | H02K 7/1869 310/12.12 |

FOREIGN PATENT DOCUMENTS

TW  200403011  2/2004

OTHER PUBLICATIONS

"Office Action of Taiwan Counterpart Application", dated Aug. 14, 2018, p. 1-p. 7.

* cited by examiner

*Primary Examiner* — Douglas W Owens
*Assistant Examiner* — Amy X Yang
(74) *Attorney, Agent, or Firm* — JCIPRNET

(57) ABSTRACT

A signal detecting device and a light-emitting apparatus using the same are provided. The signal detecting device includes an electromagnetic generator and a first switch. The electromagnetic generator includes a first receiving terminal and a second receiving terminal to receive an input signal from the first receiving terminal and the second receiving terminal and generate electromagnetic induction according to the input signal. A first terminal of the first switch is coupled to a first signal source. A second terminal of the first switch is coupled to an output terminal of the signal detecting device. The first switch determines whether the two terminals of the first switch are conducted according to the electromagnetic induction caused by the input signal.

4 Claims, 6 Drawing Sheets

SIGNAL DETECTING DEVICE AND LIGHT-EMITTING APPARATUS USING THE SAME

CROSS-REFERENCE TO RELATED APPLICATION

This application claims the priority benefit of Taiwan application serial no. 106146022, filed on Dec. 27, 2017. The entirety of the above-mentioned patent application is hereby incorporated by reference herein and made a part of this specification.

BACKGROUND OF THE INVENTION

Field of the Invention

The disclosure relates to a signal detection technique, and in particular, to a signal detecting device that detects a signal state of a light-emitting apparatus and is applicable to a wide voltage input range and a light-emitting apparatus using the same.

Description of Related Art

In general industrial application environments, it is common that equipment and machines are provided with multi-color indicators that display different color indications according to operation states of each machine to allow production line staff to learn whether each machine is in a normal operation state, a standby state, a breakdown/to-be-repaired state, etc. However, the commercially available multi-color indicators generally have different rated voltage specifications. For example, the multi-color indicators may require a DC positive voltage 24V input, a DC negative voltage −24V input, or even an AC input. Since the rated voltage specifications of multi-color indicators cover a wider signal level range but most microcontrollers can merely receive an input signal at a low voltage level (e.g., 3.3V or 5V), it becomes relatively important to prevent external noise from affecting a determination result of signal detection.

The multi-color indicators are generally provided with a photo-coupler for signal detection to prevent disturbance to detection of the input signal caused by external noise. However, in the case of a photo-coupler formed of a light-emitting diode (LED) and a photodiode, an overly large input voltage or input current or an overly large reverse bias voltage may cause the LED to burn and further cause the multi-color indicator to be unable to operate normally. Therefore, it is necessary to provide a signal detecting device for the multi-color indicator that tolerates a wider input voltage range and has a capacity for detecting bi-directional positive/negative voltage states.

SUMMARY OF THE INVENTION

The embodiments of the invention provide a light-emitting apparatus and its signal detecting device that tolerate a wider input voltage range for performing signal detection and determine a polarity state of an input signal.

The embodiments of the invention provide a signal detecting device. The signal detecting device includes an electromagnetic generator and a first switch. The electromagnetic generator includes a first receiving terminal and a second receiving terminal to receive an input signal from the first receiving terminal and the second receiving terminal and generate electromagnetic induction according to the input signal. A first terminal of the first switch is coupled to a first signal source, and a second terminal of the first switch is coupled to an output terminal of the signal detecting device. The first switch determines whether the two terminals of the first switch are conducted according to the electromagnetic induction caused by the input signal.

The embodiments of the invention provide a light-emitting apparatus. The light-emitting apparatus includes a light-emitting element, at least one signal detecting device, and a microcontroller. The light-emitting element includes a plurality of light-emitting sub-elements. Each of the light-emitting sub-elements includes a first terminal and a second terminal, and the first terminals of the light-emitting sub-elements are connected to each other. The signal detecting device includes an electromagnetic generator and a first switch. The electromagnetic generator includes a first receiving terminal and a second receiving terminal. The first receiving terminal is coupled to the first terminal of the light-emitting sub-element, and the second receiving terminal is coupled to the second terminal of the light-emitting sub-element. The electromagnetic generator receives a power input signal and generates electromagnetic induction according to the power input signal. A first terminal of the first switch is coupled to a first signal source, and a second terminal of the first switch is coupled to an output terminal of the signal detecting device. The first switch determines whether the two terminals of the first switch are conducted according to the electromagnetic induction generated by the power input signal. The microcontroller is coupled to the output terminal of the signal detecting device to determine whether the light-emitting element emits light and further determine a polarity state of the power input signal.

Accordingly, through the electromagnetic induction generated after powering the coil, the signal detecting device described in the embodiments of the invention controls a conducting state of the first switch to further allow the microcontroller to determine a light indication state of the light-emitting element in the light-emitting apparatus or further determine the polarity state of the power input signal. Therefore, the light-emitting apparatus and its signal detecting device described in the embodiments of the invention not only exhibit the effect of isolating external noise, but also tolerate a wider input voltage range and meanwhile achieve the effect of detecting the polarity state of the power input signal.

To provide a further understanding of the aforementioned and other features and advantages of the disclosure, exemplary embodiments, together with the reference drawings, are described in detail below.

DESCRIPTION OF THE EMBODIMENTS

Figure 1:
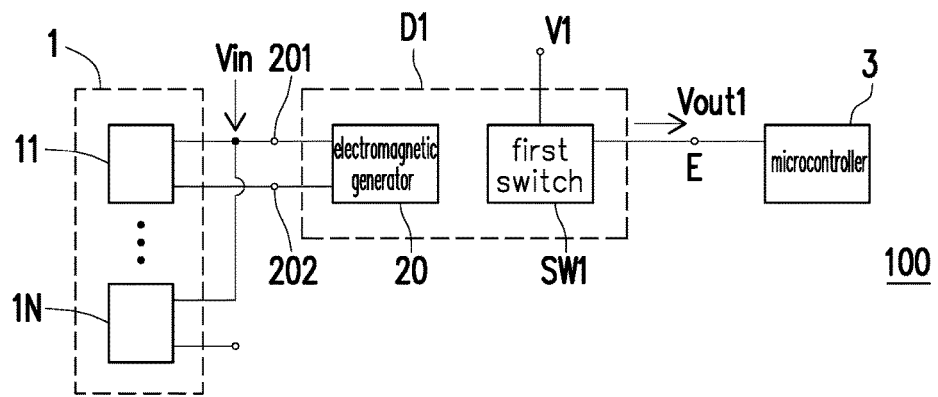
FIG. 1 is a block diagram illustrating a light-emitting apparatus according to an embodiment of the invention.

FIG. 1 is a block diagram illustrating a light-emitting apparatus 100 according to an embodiment of the invention. The light-emitting apparatus 100 includes a light-emitting element 1, at least one signal detecting device, and a microcontroller (i.e., micro control unit, MCU) 3. FIG. 1 illustrates one single signal detecting device D1 as an example. The light-emitting apparatus 100 is, for example, configured to indicate a state of a machine/equipment. The light-emitting element 1 includes a plurality of light-emitting sub-elements 11 to 1N, wherein a number of the light-emitting sub-elements 11 to 1N may be determined according to the actual requirement, and the invention does not limit the number of the light-emitting sub-elements 11 to 1N. Each of the light-emitting sub-elements 11 to 1N includes a first terminal and a second terminal, and the first terminals of the light-emitting sub-elements 11 to 1N are connected to each other.

The signal detecting device D1 in FIG. 1 is mainly configured to detect whether the light-emitting sub-element 11 in the light-emitting element 1 emits light. The signal detecting device D1 mainly includes an electromagnetic generator 20 and a first switch SW1. The electromagnetic generator 20 includes a first receiving terminal 201 and a second receiving terminal 202. The first receiving terminal 201 is coupled to the first terminal of the light-emitting sub-element 11, and the second receiving terminal 202 is coupled to the second terminal of the light-emitting sub-element 11. In the present embodiment, the first terminals of the light-emitting sub-elements 11 to 1N are connected to each other to form a power receiving terminal. The power receiving terminal is configured to receive a power input signal Vin to supply power to the light-emitting sub-elements 11 to 1N. The second terminal of each of the light-emitting sub-elements 11 to 1N is referred to as a control terminal. The light-emitting sub-elements 11 to 1N are controlled by the machine/equipment and are configured to display different light indications. In other words, the signal detecting device D1 is connected in parallel to the two terminals (i.e., the power receiving terminal and the control terminal) of the light-emitting sub-element 11. In practice, the present embodiment is implemented with a plurality of signal detecting devices, and each of the signal detecting devices respectively corresponds to a plurality of light-emitting sub-elements. Details will be described in FIG. 2 and its embodiment.

The electromagnetic generator 20 in the signal detecting device D1 can receive the power input signal Vin and generate electromagnetic induction through excitation of the power input signal Vin. A first terminal of the first switch SW1 is coupled to a first signal source V1, and a second terminal of the first switch SW1 is coupled to an output terminal E of the signal detecting device D1. The first switch SW1 determines whether the two terminals of the first switch SW1 are conducted according to the electromagnetic induction caused by the power input signal Vin. The microcontroller 3 is coupled to the output terminal E of the signal detecting device D1 to receive an output signal Vout1 of the signal detecting device D1 to thereby determine whether the light-emitting element 1 emits light. When the microcontroller 3 determines that the light-emitting element 1 is in a light-emitting state, a polarity state of the power input signal Vin may be further determined.

Figure 2:
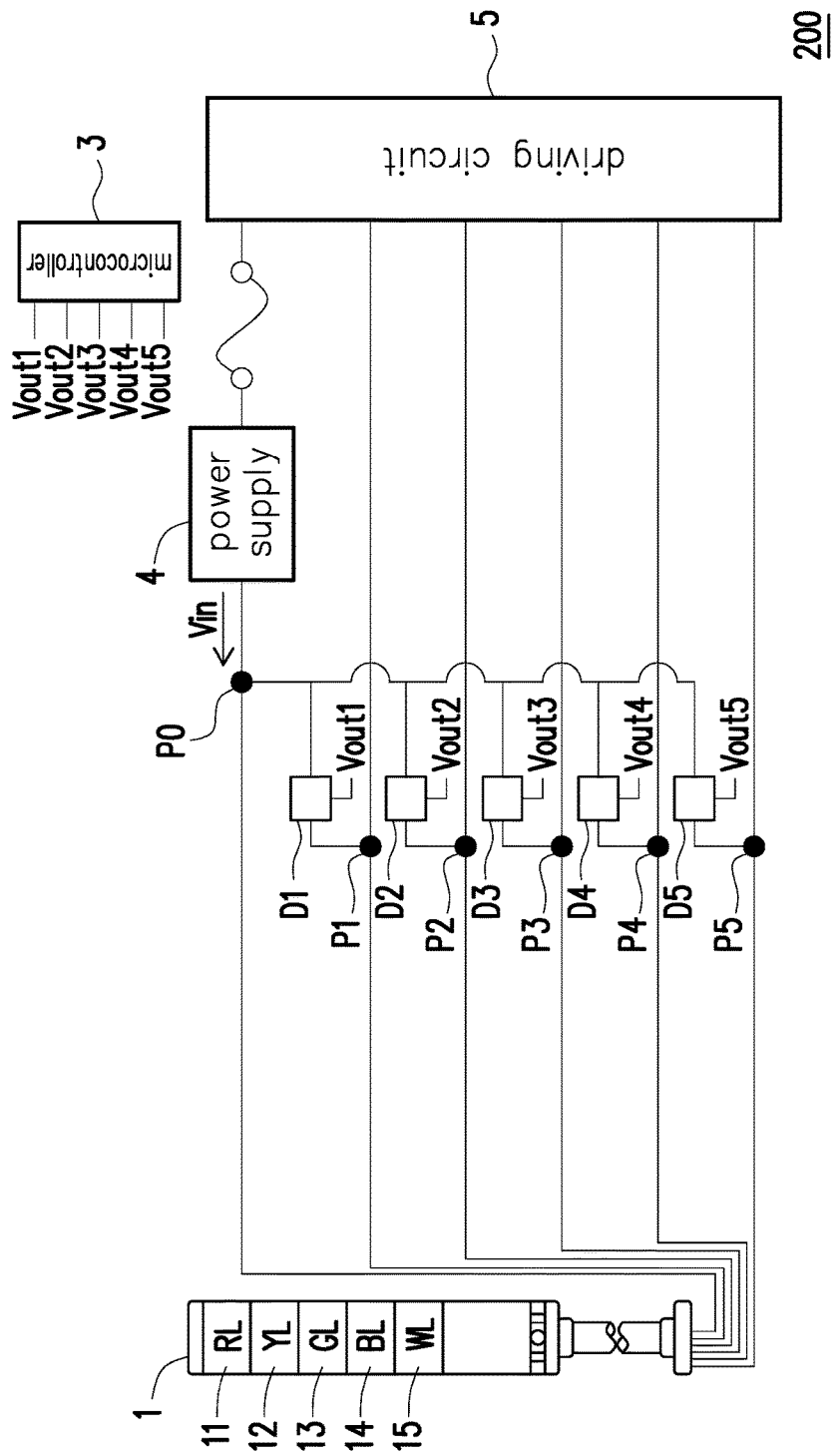
FIG. 2 is a circuit block diagram illustrating the light-emitting apparatus shown in FIG. 1.

FIG. 2 is a circuit block diagram illustrating a light-emitting apparatus 200 according to an embodiment of the invention. A difference from the light-emitting apparatus 100 of FIG. 1 lies in that the light-emitting apparatus 200 of FIG. 2 further includes a plurality of signal detecting devices D2 to D5, a power supply 4, a driving circuit 5, and a fuse. As shown in FIG. 2, the light-emitting element 1 includes five light-emitting sub-elements 11 to 15. The light-emitting sub-elements 11 to 15 respectively include a first terminal and a second terminal. The first terminals of the light-emitting sub-elements 11 to 15 are connected to each other. In the present embodiment, the light-emitting sub-elements 11 to 15 are light-emitting diodes (LED), and a light-emitting wavelength of each of the light-emitting sub-elements 11 to 15 is different. For example, the light-emitting sub-elements 11 to 15 are respectively a red LED RL, a yellow LED YL, a green LED GL, a blue LED BL, and a white LED WL. A first terminal P0 of the light-emitting sub-elements 11 to 15 is collectively connected to the power supply 4. Therefore, the first terminal P0 of the light-emitting sub-elements 11 to 15 is a power receiving terminal configured to receive a power input signal Vin. Second terminals P1 to P5 of the light-emitting sub-elements 11 to 15 are control terminals. The second terminals P1 to P5 are respectively connected to the driving circuit 5 to control light-emitting states of the light-emitting sub-elements 11 to 15. The signal detecting devices D1 to D5 have the same structure, and the signal detecting devices D1 to D5 are sequentially connected in parallel between the first terminal P0 and the second terminals P1 to P5 of the light-emitting sub-elements 11 to 15. The signal detecting devices D1 to D5 are coupled to the microcontroller 3 to determine a light-emitting state of the light-emitting element 1 or further determine a polarity state of the power input signal Vin. The fuse is disposed between the driving circuit 5 and the power supply 4. The fuse functions to prevent the driving circuit 5 from burning due to an overly large current flowing through the fuse.

Figure 3:
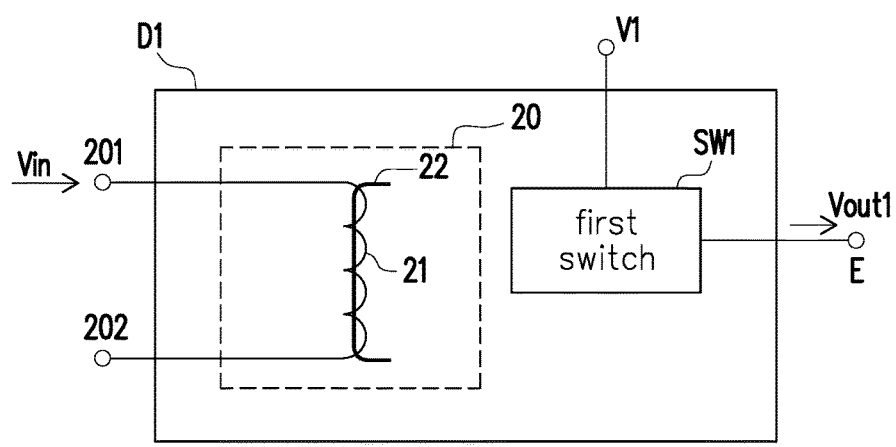
FIG. 3 is a block diagram illustrating a signal detecting device shown in FIG. 2.

FIG. 3 is a block diagram illustrating the signal detecting device D1 shown in FIG. 2. The electromagnetic generator 20 includes a coil 21 and a supporting member 22. The coil 21 is wound on the U-shaped supporting member 22. In the present embodiment, the supporting member 22 is formed of an iron core. The supporting member may also be formed of other magnetic materials such as iron, silicon steel, iron-cobalt alloy, iron-nickel alloy, etc. In some embodiments, the supporting member 22 may also be formed of a non-magnetic material. In that case, the supporting member 22 formed of the non-magnetic material cannot enhance the electromagnetic induction effect. A first terminal of the coil 21 is coupled to the first receiving terminal 201 of the electromagnetic generator 20, and a second terminal of the coil 21 is coupled to the second receiving terminal 202 of the electromagnetic generator 20. When the electromagnetic generator 20 receives the power input signal Vin, a current flows through the coil 21, and electromagnetic induction is thus generated. Although the coil 21 of the present embodiment is wound on the supporting member 22, it is also possible that the electromagnetic generator 20 of the embodiments of the invention is not provided with the supporting member 22, and the coil 21 is directly wound into a U shape. Providing the supporting member 22 not only supports the coil 21, but also reinforces the electromagnetic induction effect.

A first terminal of the first switch SW1 is coupled to a first signal source V1, and a second terminal of the first switch SW1 is coupled to an output terminal E of the signal detecting device D1. The first switch SW1 determines whether the two terminals of the first switch SW1 are conducted according to the electromagnetic induction generated by the electromagnetic generator 20.

Figure 4A:
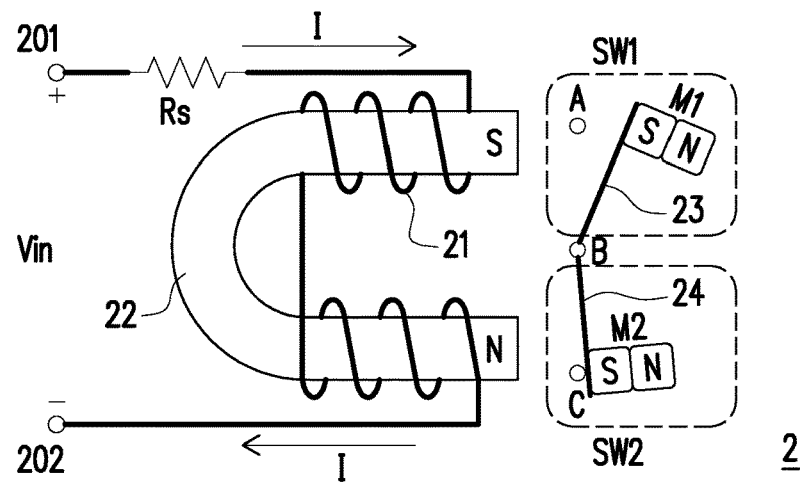
FIG. 4A to FIG. 4B are schematic diagrams illustrating generating electromagnetic induction inside a signal detecting device according to an embodiment of the invention.
Figure 4B:
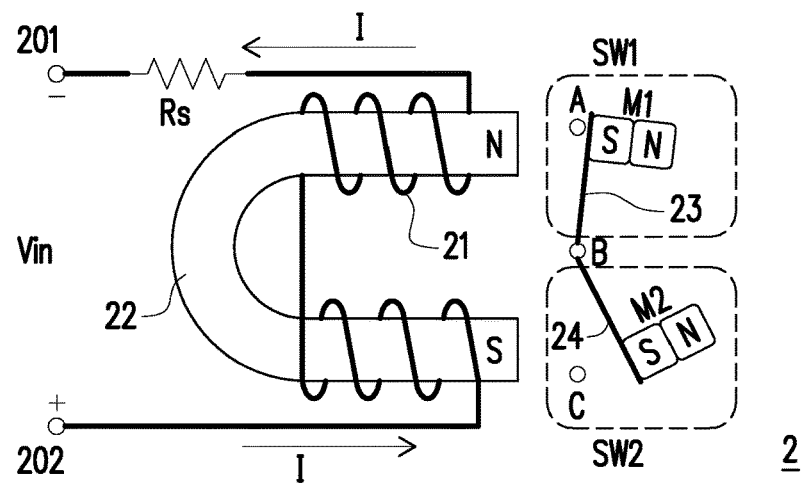

The electromagnetic generator 20 generates different electromagnetic induction according to a polarity state of the power input signal Vin. For example, FIG. 4A to FIG. 4B are schematic diagrams illustrating generating electromagnetic induction inside a signal detecting device according to an embodiment of the invention. As shown in FIG. 4A, a signal detecting device 2 includes the coil 21, the supporting member 22, the first switch SW1, and a second switch SW2. A winding direction of the coil 21 wound on an upper end of the supporting member 22 is different from a winding direction of the coil 21 wound on a lower end of the supporting member 22, such that a magnetic pole of the supporting member at the upper end is different from a magnetic pole of the supporting member at the lower end. In the present embodiment, the magnetic pole of the supporting member at the upper end is an S-pole, and the magnetic pole of the supporting member at the lower end is an N-pole. The first switch SW1 is disposed close to the upper end of the supporting member 22, and the second switch SW2 is disposed close to the lower end of the supporting member 22.

The first switch SW1 includes a first magnetic member M1 and a first electrically conductive member 23. The second switch SW2 includes a second magnetic member M2 and a second electrically conductive member 24. One terminal of the first electrically conductive member 23 and one terminal of the second electrically conductive member 24 are connected to a common terminal B. The other terminal of the first electrically conductive member 23 and the other terminal of the second electrically conductive member 24 are respectively provided with the first magnetic member M1 and the second magnetic member M2. In the present embodiment, the first magnetic member M1 and the second magnetic member M2 are both permanent magnets, and magnetic poles of the first magnetic member M1 and the second magnetic member M2 are arranged such that the same magnetic pole faces the supporting member 22. For example, the first magnetic member M1 and the second magnetic member M2 are arranged such that the S-poles of both of them face the supporting member 22, or the N-poles of both of them face the supporting member 22. To facilitate illustration, in the embodiment of FIG. 4A to FIG. 4B, the first magnetic member M1 and the second magnetic member M2 are both arranged such that the S-pole faces the supporting member 22.

Moreover, as shown in FIG. 4A to FIG. 4B, a resistor Rs is connected in series between the upper terminal (i.e., the first terminal) of the coil 21 and the first receiving terminal 201 of the signal detecting device 2. The resistor Rs not only functions to limit the current, but a range of a maximum input voltage may also be adjusted by selecting a resistor Rs of a different resistance. For example, if a maximum allowable current of the coil 21 is 1 A, a resistor Rs having a resistance of 1K ohm may be selected, such that a maximum allowable DC voltage range of the power input signal Vin can be a range as much as 1 KV.

When the power input signal Vin is a positive signal, as shown in FIG. 4A, the coil 21 is powered and a current I flows through the coil 21. As the current I flows through the coil 21 including the U-shaped supporting member 22, electromagnetic induction is generated, such that the upper end of the supporting member 22 becomes an S-pole, and the lower end of the supporting member 22 becomes an N-pole. When the first magnetic member M1 and the second magnetic member M2 sense that electromagnetic induction is generated by the coil 21, the S-pole of the supporting member 22 pushes the first electrically conductive member 23 away due to the property that the same poles repel each other, such that an A terminal and a B terminal of the first switch SW1 are in an open-circuit state. Meanwhile, the N-pole of the supporting member 22 attracts the second electrically conductive member 24 due to the property that the opposite poles attract each other, such that a B terminal and a C terminal of the second switch SW2 are in a short-circuit state.

When the power input signal Vin is a negative signal, as shown in FIG. 4B, the coil 21 is powered and the current I flows through the coil 21. As the current I flows through the coil 21 including the U-shaped supporting member 22, electromagnetic induction is generated, such that the upper end of the supporting member 22 becomes an N-pole, and the lower end of the supporting member 22 becomes an S-pole. When the first magnetic member M1 and the second magnetic member M2 sense that electromagnetic induction is generated by the coil 21, the N-pole of the supporting member 22 attracts the first electrically conductive member 23 due to the property that the opposite poles attract each other, such that the A terminal and the B terminal of the first switch SW1 are in a short-circuit state. Meanwhile, the S-pole of the supporting member 22 pushes the second electrically conductive member 24 away due to the property that the same poles repel each other, such that the B terminal and the C terminal of the second switch SW2 are in an open-circuit state.

Figure 5:
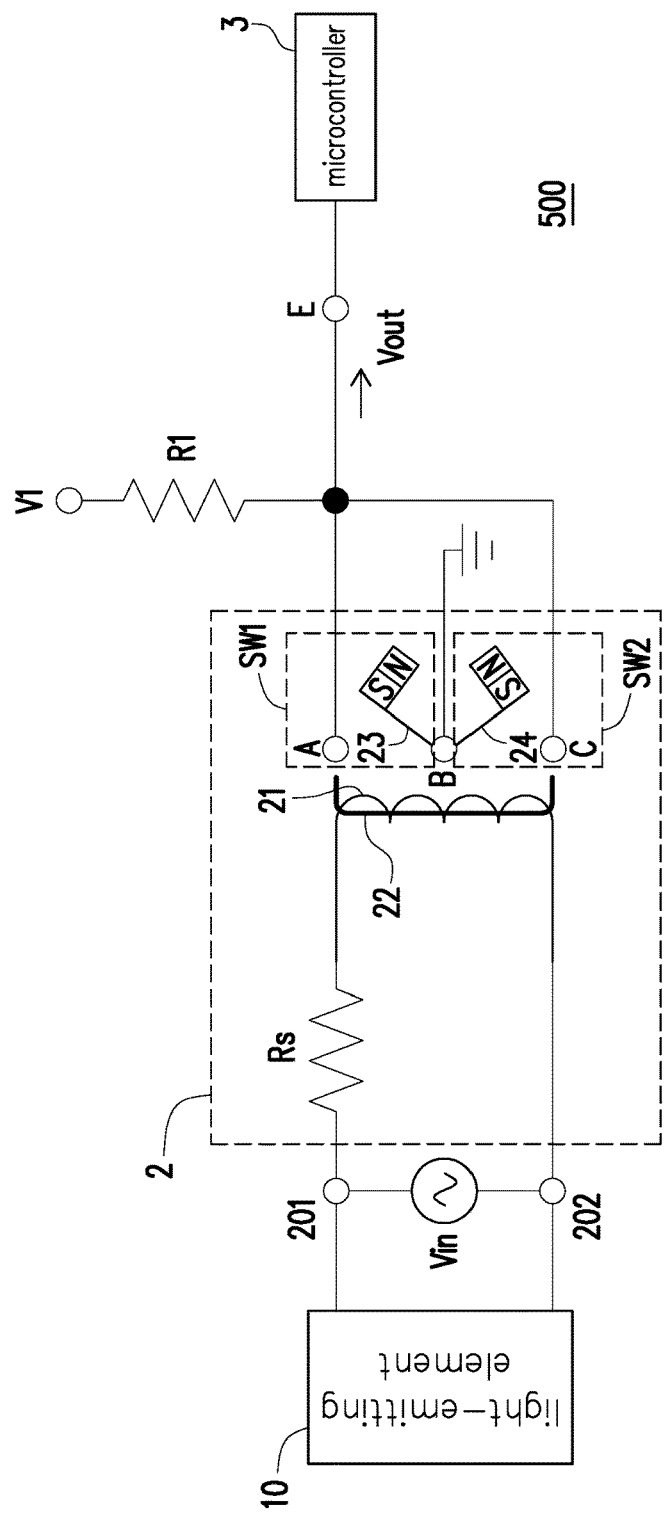
FIG. 5 is a block diagram illustrating how a light-emitting apparatus detects a light-emitting state according to an embodiment of the invention.
Figure 6:
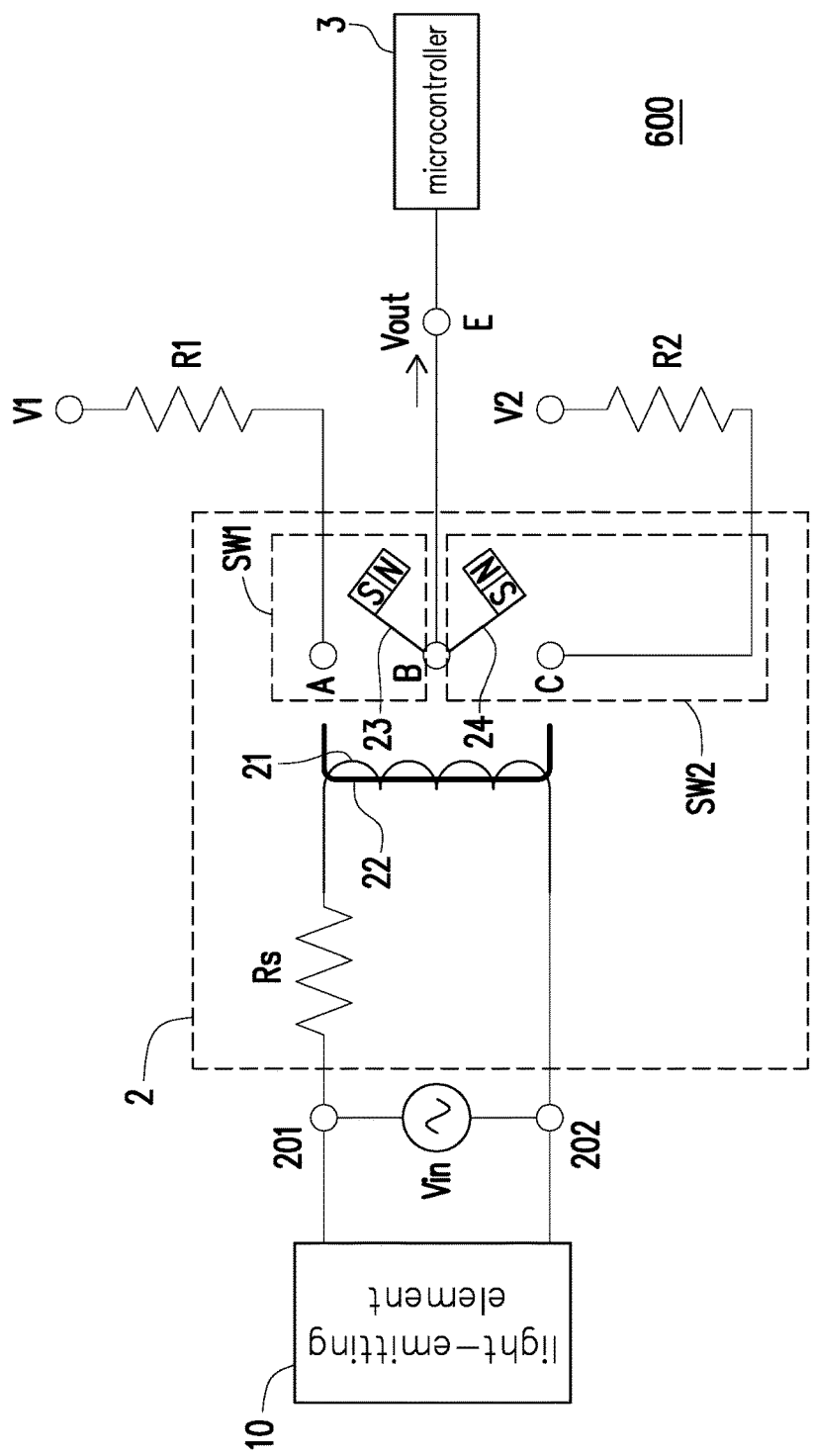
FIG. 6 is a block diagram illustrating detecting an input signal state according to an embodiment of the invention.

In the description below, the embodiments of FIG. 5 and FIG. 6 are used to illustrate how to determine a light-emitting state of the light-emitting apparatus through the signal detecting device 2 of FIG. 4A to FIG. 4B and further determine a polarity state of the power input signal Vin.

FIG. 5 is a detailed circuit diagram illustrating how a light-emitting apparatus 500 detects a light-emitting state according to an embodiment of the invention. As shown in FIG. 5, the light-emitting apparatus 500 includes a light-emitting element 10, the signal detecting device 2, and the microcontroller 3. The light-emitting element 10 (e.g., an LED) is coupled between the first receiving terminal 201 and the second receiving terminal 202 of the signal detecting device 2. The common terminal B of the first switch SW1 and the second switch SW2 is grounded. The A terminal of the first switch SW1 and the C terminal of the second switch SW2 are coupled to the output terminal E of the signal detecting device 2. The A terminal of the first switch SW1 is coupled to the first signal source V1 (e.g., 3.3V) via a pull-up resistor R1. The output terminal E of the signal detecting device 2 is coupled to the microcontroller 3.

When the power input signal Vin is a positive signal, according to the description of FIG. 4A above, due to the electromagnetic induction generated by the coil 21, the upper end of the supporting member 22 becomes an S-pole, and the lower end of the supporting member 22 becomes an N-pole. The S-pole of the supporting member 22 pushes the first electrically conductive member 23 away due to the property that the same poles repel each other, such that the A terminal and the B terminal of the first switch SW1 are in an open-circuit state. Meanwhile, the N-pole of the supporting member 22 attracts the second electrically conductive member 24 due to the property that the opposite poles attract each other, such that the B terminal and the C terminal of the second switch SW2 are in a short-circuit state. Therefore, an output signal Vout of the signal detecting device 2 is at a low level (a ground level). When the microcontroller 3 receives the low-level signal, the microcontroller 3 determines that the light-emitting element 10 is in the light-emitting state.

When the power input signal Vin is a negative signal, according to the description of FIG. 4B above, due to the electromagnetic induction generated by the coil 21, the upper end of the supporting member 22 becomes an N-pole, and the lower end of the supporting member 22 becomes an S-pole. The N-pole of the supporting member 22 attracts the first electrically conductive member 23 due to the property that the opposite poles attract each other, such that the A terminal and the B terminal of the first switch SW1 are in a short-circuit state. Meanwhile, the S-pole of the supporting member 22 pushes the second electrically conductive member 24 away due to the property that the same poles repel each other, such that the B terminal and the C terminal of the second switch SW2 are in an open-circuit state. Therefore, the output signal Vout of the signal detecting device 2 is at a low level (a ground level). When the microcontroller 3 receives the low-level (ground-level) signal, the microcontroller 3 determines that the light-emitting element 10 is in the light-emitting state.

When the signal detecting device 2 does not receive the power input signal Vin, the coil 21 does not generate electromagnetic induction. Therefore, the A terminal and the B terminal of the first switch SW1 and the B terminal and the C terminal of the second switch SW2 are both in an open-circuit state. Accordingly, the output signal Vout of the signal detecting device 2 is at a high level (e.g., 3.3V). When the microcontroller 3 receives the high-level (e.g., 3.3V) signal, the microcontroller 3 determines that the light-emitting element 10 is in a non-light-emitting state.

FIG. 6 is a detailed circuit diagram illustrating how a light-emitting apparatus 600 detects a light-emitting state according to an embodiment of the invention. As shown in FIG. 6, the light-emitting apparatus 600 includes the light-emitting element 10, the signal detecting device 2, and the microcontroller 3. The light-emitting element 10 (e.g., an LED) is coupled between the first receiving terminal 201 and the second receiving terminal 202 of the signal detecting device 2. The common terminal B of the first switch SW1 and the second switch SW2 is coupled to the output terminal E of the signal detecting device 2. The A terminal of the first switch SW1 is coupled to the first signal source V1 (e.g., 3.3V) via a pull-up resistor R1. The C terminal of the second switch SW2 is coupled to a second signal source V2 (e.g., 1.8V) via a pull-up resistor R2. The output terminal E of the signal detecting device 2 is coupled to the microcontroller 3.

When the power input signal Vin is a positive signal, similar to the case of FIG. 5, the A terminal and the B terminal of the first switch SW1 are in an open-circuit state, and the B terminal and the C terminal of the second switch SW2 are in a short-circuit state. Therefore, the output signal Vout of the signal detecting device 2 is at the level (e.g., 1.8V) of the second signal source V2. When the microcontroller 3 receives the signal at the V2 level (e.g., 1.8V), the microcontroller 3 determines that the light-emitting element 10 is in the light-emitting state and determines that the power input signal Vin is a positive signal.

When the power input signal Vin is a negative signal, similar to the case of FIG. 5, the A terminal and the B terminal of the first switch SW1 are in a short-circuit state, and the B terminal and the C terminal of the second switch SW2 are in an open-circuit state. Therefore, the output signal Vout of the signal detecting device 2 is at the level (e.g., 3.3V) of the first signal source V1. When the microcontroller 3 receives the signal at the V1 level (e.g., 3.3V), the microcontroller 3 determines that the light-emitting element 10 is in the light-emitting state and determines that the power input signal Vin is a negative signal.

When the signal detecting device 2 does not receive the power input signal Vin, the coil 21 does not generate electromagnetic induction. Therefore, the A terminal and the B terminal of the first switch SW1 and the B terminal and the C terminal of the second switch SW2 are both in an open-circuit state. Accordingly, the common terminal B of the first switch SW1 and the second switch SW2 is in a floating state. As a result, the output signal Vout of the signal detecting device 2 is at 0V, and at this time, the microcontroller 3 determines that the light-emitting element 10 is in the non-light-emitting state. Since the microcontroller 3 can determine and recognize whether the power input signal Vin is a negative voltage, a positive voltage, or the power input signal Vin is not present according to the output signal Vout (e.g., 3.3V, 1.8V, or 0V) of the signal detecting device 2, the light-emitting apparatus 600 of FIG. 6 has the capacity for detecting bi-directional positive/negative voltage states and can be applied to multi-color indicators of different rated voltage specifications available on the market.

In summary of the above, through the electromagnetic induction generated after powering the coil 21, the signal detecting device 2 described in the embodiments of the invention controls the conducting states of the first switch SW1 and the second switch SW2 to further allow the microcontroller 3 to determine the light-emitting state of the light-emitting element 10 in the light-emitting apparatus 600 or further determine the polarity state of the power input signal Vin. Accordingly, the light-emitting apparatus and its signal detecting device described in the embodiments of the invention not only exhibit the effect of isolating external noise, but also tolerate a wider input voltage range and meanwhile achieve the effect of detecting the polarity state of the power input signal.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A signal detecting device comprising:
an electromagnetic generator comprising a first receiving terminal and a second receiving terminal and configured to receive an input signal from the first receiving terminal and the second receiving terminal and generate electromagnetic induction according to the input signal; and
a first switch comprising a first terminal coupled to a first signal source and a second terminal coupled to an output terminal of the signal detecting device,
wherein the first switch determines whether the two terminals of the first switch are conducted according to the electromagnetic induction generated by the input signal,
wherein the electromagnetic generator comprises:
a coil comprising a first terminal coupled to the first receiving terminal and a second terminal coupled to the second receiving terminal; and
a supporting member, the coil being wound on the supporting member to generate the electromagnetic induction,
wherein the supporting member is in a U-shape, and a winding direction of the coil wound on a first end of the supporting member is different from a winding direction of the coil wound on a second end of the supporting member, such that a magnetic pole of the supporting member at the first end is different from a magnetic pole of the supporting member at the second end,
wherein the first switch is close to the first end of the supporting member, and the first switch comprises:
a first magnetic member, wherein a magnetic pole of the first magnetic member close to the first end of the supporting member is identical to the magnetic pole of the first end of the supporting member; and
a first electrically conductive member, wherein the first magnetic member is disposed on the first electrically conductive member, and when the first magnetic member senses the electromagnetic induction, the first electrically conductive member is pushed due to the electromagnetic induction to thereby determine whether the two terminals of the first switch are conducted,
the signal detecting device further comprising:
a second switch comprising a first terminal coupled to a second signal source and a second terminal coupled to the output terminal of the signal detecting device, wherein the second switch determines whether the two terminals of the second switch are conducted according to the electromagnetic induction generated by the input signal.

2. The signal detecting device according to claim 1 wherein the supporting member is formed of a magnetic material.

3. The signal detecting device according to claim 1, wherein the second switch is close to the second end of the supporting member, and the second switch comprises:
a second magnetic member, wherein a magnetic pole of the second magnetic member close to the second end of the supporting member is different from the magnetic pole of the second end of the supporting member; and
a second electrically conductive member, wherein the second magnetic member is disposed on the second electrically conductive member, and when the second magnetic member senses the electromagnetic induction, the second electrically conductive member is pushed due to the electromagnetic induction to thereby determine whether the two terminals of the second switch are conducted.

4. A light-emitting apparatus comprising:
a light-emitting element comprising a plurality of light-emitting sub-elements, wherein each of the light-emitting sub-elements comprises a first terminal and a second terminal, and the first terminals of the light-emitting sub-elements are connected to each other;
at least one signal detecting device comprising:

an electromagnetic generator comprising a first receiving terminal and a second receiving terminal, wherein the first receiving terminal is coupled to the first terminal, the second receiving terminal is coupled to the second terminal, and the electromagnetic generator receives a power input signal and generates electromagnetic induction according to the power input signal, wherein the electromagnetic generator comprises:
a coil comprising a first terminal coupled to the first receiving terminal and a second terminal coupled to the second receiving terminal; and
a supporting member, the coil being wound on the supporting member, wherein the supporting member is in a U-shape, and a winding direction of the coil wound on a first end of the supporting member is different from a winding direction of the coil wound on a second end of the supporting member, such that a magnetic pole of the supporting member at the first end is different from a magnetic pole of the supporting member at the second end; and
a first switch comprising a first terminal coupled to a first signal source and a second terminal coupled to an output terminal of the signal detecting device, wherein the first switch determines whether the two terminals of the first switch are conducted according to the electromagnetic induction generated by the power input signal, wherein the first switch is close to the first end of the supporting member, and the first switch comprises:
a first magnetic member, wherein a magnetic pole of the first magnetic member close to the first end of the supporting member is identical to the magnetic pole of the first end of the supporting member; and
a first electrically conductive member, wherein the first magnetic member is disposed on the first electrically conductive member, and when the first magnetic member senses the electromagnetic induction, the first electrically conductive member is pushed due to the electromagnetic induction to thereby determine whether the two terminals of the first switch are conducted; and
a microcontroller coupled to the output terminal of the signal detecting device and configured to determine whether the light-emitting element emits light and further determine a polarity state of the power input signal.

* * * * *